United States Patent
Marchand et al.

(10) Patent No.: US 6,556,669 B2
(45) Date of Patent: Apr. 29, 2003

(54) INTERNATIONAL ORIGINATION TO DOMESTIC TERMINATION CALL BLOCKING

(75) Inventors: Dean C. Marchand, Brighton, CO (US); Arthur Lance Springer, Waterloo, IA (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/859,325

(22) Filed: May 17, 2001

(65) Prior Publication Data

US 2003/0048889 A1 Mar. 13, 2003

(51) Int. Cl.[7] .................. H04M 15/00; H04M 17/00
(52) U.S. Cl. .................. 379/114.14; 379/114.04; 379/145; 379/127.02; 379/189
(58) Field of Search .................. 379/91.01, 91.02, 379/93.02, 93.03, 111, 114.04, 114.14, 114.05, 114.2, 115.02, 115.03, 121.01, 127.02, 144.01, 144.03, 145, 188, 189, 191, 194, 197

(56) References Cited

U.S. PATENT DOCUMENTS

| | | | | |
|---|---|---|---|---|
| 5,333,185 A | * | 7/1994 | Burke et al. | 379/127 |
| 5,495,521 A | * | 2/1996 | Rangachar | 379/95 |
| 5,506,894 A | * | 4/1996 | Billings et al. | 379/127 |
| 5,566,234 A | * | 10/1996 | Reed et al. | 379/188 |
| 5,867,566 A | * | 2/1999 | Hogan et al. | 379/115 |
| 6,307,926 B1 | * | 10/2001 | Barton et al. | 379/189 |
| 6,335,971 B1 | * | 1/2002 | Springer et al. | 379/189 |
| 6,396,915 B1 | * | 5/2002 | Springer et al. | 379/145 |
| 6,404,865 B1 | * | 6/2002 | Springer et al. | 379/114.14 |

* cited by examiner

Primary Examiner—Binh Tieu

(57) ABSTRACT

A method and device for preventing fraud in special service calls from an international origin point to a domestic terminating point through a long-distance telecommunications system is described. In the system and method, a Screening for International Calls database is added to the Integrated Services Network (ISN) platform. The records in the Screening for International Calls database are keyed by the country code and contain a field for blocked terminating regions. When an international call is made, the record corresponding to the international origin point is retrieved from the Screening for International Calls database. This record is checked to determine if there are terminating regions indicated in the blocked exchange field. If there are no terminating regions indicated in the blocked exchange field, call processing continues. If there are terminating regions indicated in the blocked exchange field, the terminating regions in the blocked exchange field are checked against the terminating point of the call. If the terminating point of the call is within the terminating region, the call is blocked.

18 Claims, 7 Drawing Sheets

INTERNATIONAL ORIGINATION TO DOMESTIC TERMINATION CALL BLOCKING

BACKGROUND

1. Technological Field

The present application relates generally to fraud control in telecommunications systems and, in particular, to preventing fraud in calls from an international origin point to a domestic terminating point in a long distance telecommunications network.

2. Description of the Related Art

The telecommunications industry has experienced significant changes in the way that customers are billed for their telephone calls. From the once simple method of billing the originating caller, many methods have been developed, allowing greater flexibility for the telecommunications customer. A predominant method for making telephone calls away from home or the office is by utilizing the telephone calling card to charge the call. This method has grown to include multinational travelers, who bring their calling cards with them to international destinations.

Calling card customers may use any telephone facility, including public facilities, to make a call that will be charged to their account. When calling domestically, the process of making calls using a calling card typically includes dialing an "800" number, waiting for an audio prompt, and then entering an account number and a Personal Identification Number (PIN) into a telephone key pad device. The "800" (and now "888") number phone calls are one type of a category of phone calls called "special service" calls. These special service calls, which include "700", "800/888", and "900" number calls, allow contemporary telecommunications networks to provide many services beyond direct distance dialing. It is the long distance carriers that provide this special service call processing, which allows for toll-free calls, calling card calls, special rate calls, etc. When dialing from an international location, instead of the "800" number, there is typically an access code for the particular country from which one is dialing. However, the procedure followed is similar in all special service calls.

Following the example of a calling card call, once the account, number and PIN have been entered, the calling card customer can make one or more calls from whatever location the customer is dialing in from. These calls are subsequently charged to the customer's calling card account. Calling cards can also be used to avoid having to pay additional surcharges when making calls from certain public facilities such as hotels and telephone booths.

As with many new technologies, the ease and flexibility of the use of calling cards has led to abuse, and has consequently brought about new types of fraud. Calling card fraud costs businesses (and consumers) millions of dollars annually. Current security mechanisms, while effective, are not fail-safe, and protection mechanisms for consumers and businesses require improvement to stem these fraud-related losses.

There is a virtual underground industry in stolen calling cards and authorization codes. The multitude of ways that calling cards and authorization numbers find their way into unscrupulous hands need not be discussed here, but suffice it to say there is no end to the ingenuity of the criminal mind. One example of calling card fraud is the technique of "surfing" banks of public telephones, such as are at airports. Criminals "surf" by looking over the shoulders of legitimate card users as they key in the account number and PIN. Then they sell or distribute these numbers and rampant fraud results. In some cases, a single account may incur charges in excess of $100,000 in a single weekend. Calling card fraud and other forms of fraudulent use present pervasive problems for telephone carriers, particularly long distance carriers.

One method of fraud control is to simply remove calling card numbers against which it is suspected that fraudulent calls are being charged. In order to recognize fraudulent calls, a "billing number"—a billing product and an account number, such as a calling card, pre-paid phone card, etc.—is monitored over time. For example, where the number of domestic calls placed within a certain amount of time using the same billing number exceeds a certain threshold, an alert is generated. International calls may have a lower threshold so that fewer calls within the time period generate an alert. In addition, the threshold may be further adjusted for calls to countries where a high percentage of fraudulent calls are directed.

Another method of fraud control is to identify particular origin points that are linked to suspicious activity and to block certain calls from those particular origin points. For example, a large number of long duration calls to China may be generated from an exchange in Manhattan. This would generate a threshold alert, which is typically sent to a fraud analyst. A fraud analyst would be stationed at a fraud control console 100, as shown in FIG. 1A. The fraud analyst analyzes the alert and the history of that exchange in order to determine whether or not to block that exchange from calling China. If the fraud analyst decides that there is fraudulent activity, he sets up a block on that exchange which will prevent subsequent calls to China or other international destinations that the fraud analyst selects.

However, this method is of no help with calls that originate from international locations and terminate domestically. Unlike the situation described above, the fraud analyst has no means to analyze and track international origin points with any specificity. For example, when a call originates at telephone 111 in China as shown in FIG. 1A and enters the long distance telecommunications network (or Inter-Exchange Carrier, IXC) 130 at IXC switch 131, the only information that the IXC network knows about the origin of that call is its country code (CC). Thus, a fraud analyst, or any program monitoring for threshold alerts, is not able to recognize if a call originates from a telephone exchange that is known to generate a large amount of fraudulent traffic. All that is known is that the call originated in China.

The present invention concerns this type of international special service call and, in particular, a method and system of blocking fraudulent special service calls that originate internationally and terminate domestically. In order to fully understand the threat posed by such calls, an example of this type of fraudulent special service call is described with reference to FIGS. 1A–1C and 2. In this example, a hacker in China makes a fraudulent call to a domestic (U.S.A.) Private Branch Exchange (PBX) 180, where the hacker steals the dialtone in order to make outgoing calls. Of course, "800" number calls are the preferred method of entrance into PBXs, because even the call hacking into the system is free. If possible, the international hacker uses an international "800" number to break into the PBX. The outgoing calls are charged to the PBX owner regardless of the origination of the call. The losses from both the original international call and the following PBX outgoing calls are typically shouldered by the long distance telecommunications company in order to keep customer goodwill.

Starting with FIG. 1A, the hacker, using telephone 111 in China, dials in the appropriate access code to reach the IXC network 130. The call enters through IXC switch 131 and is routed to bridge switch 135 through IXC switch 132. The purpose of the bridge switch 135 is to receive, calls from the IXC network and bridge them to the Automatic Call Distributor (ACD) 140 and, ultimately, into the Intelligent Services Network platform (ISN) 150. Because special service calls require special call processing, they are typically routed to a call processing platform, such as the ISN platform 150. There are a number of ISNs within the IXC, but, for the purpose of understanding the present invention, one ISN will suffice.

An exemplary and simplified diagram of the ISN platform 150 will now be described with reference to FIG. 2. The ACD 140 is under the direct control of the Application Processor APP 156, which is a general purpose computer that functions as the central point for call routing control in the ISN 150. When the international origination call arrives at the ACD 140, the ACD 140 makes a request to the APP 156 for directions as to how the call should be handled. Such a request would usually be accompanied by information concerning the call; i.e. the country code (CC) of the caller, the access code used to access the IXC system, the type of billing product being used (calling card, collect call, third party call, etc.), and the destination number of the call. The APP 156 would recognize by the access code the appropriate procedure to be performed and, consequently, the APP 156 would instruct the ACD 140 to deliver the call to the appropriate queue. In this case, it is assumed that the call is queued up to the Automatic Response Unit (ARU) 152. The ARU 152 comprises two components, one to process the call, the other to prompt the caller with a voice response system. It is the ARU 152 that will ask the caller for the required final destination number, calling card number, and PIN. When a live operator is required, the call is routed to the Manual Telecommunications Operator Console (MTOC) 154. Whether the call is routed to the ARU 152 or the MTOC 154, the same informational decisions will have to be made. In other words, regardless of whether it is entered by the operator at the MTOC 154 or by the caller at her telephone 111 to the ARU 152, items such as the calling card account number will have to be entered.

The steps performed during call processing will be described later in an abridged form. When call processing is completed, and the call is authorized and validated, the call is released from the ACD 140 and the bridge switch 135 to the automated switching of the IXC network 130. The call is then routed by the destination number, which takes the form 1-NPA-NXX-XXXX as set forth in the North American Numbering plan (NANP). NPA stands for Number Plan Area, often referred to as the "area code", which defines the geographic region of the number; NXX is the terminating exchange, typically identifying a switch within the geographic region, and XXX is the unique station designation. For most calls, the NPA will also signify to which LEC the call should be sent. As shown in FIG. 1B, the call is connected through IXC switch 133 to a Local Exchange Carrier (LEC) 160. LEC refers to local telephone companies, such as the Regional Bell Operating Companies (RBOCs), which provide local transmission services for their customers. The LEC 160 is connected to the IXC 130 through a Point-of-Presence (POP) switch 166. The routers in the LEC will forward the call to the terminating point of the international call, as indicated by the destination number input by the hacker. In this case, the call is routed through LEC switches 164 and 162 to destination PBX 180, the target of the hacker at telephone 111 in China.

When the international call reaches the PBX 180 of the corporate customer, the hacker dials in the extension of someone the hacker knows isn't there. Because the call goes unanswered, it is forwarded to the voice messaging system (VMS) 182. At this point, the hacker requests a call transfer, by, for example, pressing the "*" and "T" buttons on his phone. In some PBX systems, this activates a call transfer feature which prompts the hacker to enter an extension number followed by the pound sign. The hacker responds by entering a trunk access code digit followed by the beginning digits of the phone number the hacker wishes to reach and, lastly, the pound sign. The PBX 180, in response to the starting trunk access code digit, selects an outgoing trunk line and dials the first digits. Once the hacker is connected to the trunk line, he dials in the remaining 1digits.

In FIG. 1C, the completed telephone call is shown terminating at a telephone 190 in the domestic United States through LEC 120. Thus, the call is routed out of the PBX 180, back through the LEC 160, through IXC switches 133, 134, 136, and 138, to POP switch 125 in LEC 120. Once within LEC 120, the call is routed through LEC switches 124 and 122 to the destination telephone 190. While maintaining the connection as shown in FIG. 1B, the hacker will make multiple calls, typically long distance, using PBX 180, as shown in FIG. 1C. As far as the telephone system is concerned, these long distance calls are being placed from PBX 180, and not the hacker at telephone 111. So the billing records will indicate that the owner of PBX 180 made a series of expensive long distance calls. If the hacker was clever enough to dial an "800" number to hack into the PBX 180, even the original fraudulent call will be charged to the PBX owner 180.

Now, a simplified and exemplary call processing procedure will be described with reference to FIGS. 2 and 3. Many steps that are required for call processing have been eliminated from the description as unnecessary for the understanding of the present invention. Assuming that the special services call is a calling card call from an international origin to a domestic destination, the caller needs to enter an access number to access the IXC 130, her account number, her PIN, and the terminating Automatic Number Identifier (ANI). It is assumed that all of this data is input before the procedure begins, but, as one skilled in the relevant art would know, some of the data could just as well be entered during the procedure. Following this example, once input is complete, the billing number associated with the customer account is looked up in the Billed Number Screening (BNS) database 170 at step 310. The BNS contains records keyed by billing numbers and has flags to indicate various limitations on particular billing numbers. It is determined whether.the billing number is flagged in step 315. If the billing number is flagged, the call may be re-routed to an MTOC 154, a fraud analyst at a fraud console 100, or simply disconnected. If the billing number is not flagged in step 315, call processing continues to completion.

The initial series of steps involving the BNS 170 are the primary focus for the rest of this application. With this in mind, there are other databases that are accessed for other purposes during processing an international special service call, but they will not be discussed here. These steps, and others, have been left out as extraneous to an understanding of the prior art and the present invention.

The method as described above is too narrowly targeted to effectively eliminate fraudulent calls made from international countries that have been recognized as generating a large amount of fraudulent calls. Basically, only billing numbers that have been recognized as fraudulent will be blocked from calling into the IXC network from another country. This is unsatisfactory and inefficient for the long distance company. For example, there are domestic regions in the United States that are frequently targeted by foreign hackers that have an entire block of fraudulent calling cards. Once a particular billing number is recognized as fraudulent and blocked, the hacker moves on to the next. The narrow blocking provided by the BNS 170 is of little use in defeating such a hacker.

Therefore, there is a need to block fraudulent calls from international originating points to domestic terminating points through long distance telecommunications systems. Furthermore, the manner of blocking calls must allow for the situation of multiple billing numbers being used by an international hacker to make calls to domestic terminating points.

SUMMARY

One object of this invention is to provide a system and method of targeting sophisticated hackers when blocking international regions from calling terminating destinations in a long distance telecommunications network to minimize fraudulent activity.

Another object of this invention is to provide a system and a method for blocking international countries from calling particular exchanges in a long distance telecommunications network to minimize fraudulent activity.

To accomplish the above and other objects, a system and method for preventing fraud on international special service calls from an international origin point to a domestic terminating point through a long-distance telecommunications system is disclosed. In the system and method, a Screening for International Calls database is added to the ISN platform 150. The records in the Screening for International Calls database are keyed by the country code and contain a field for blocked exchanges. When an international call is made, the record corresponding to the international origin point is retrieved from the Screening for International Calls database. This record is checked to determine if there are exchanges in the blocked exchange field. If there are no exchanges in the blocked exchange field, call processing continues. If there are exchanges in the blocked exchange field, the exchanges in the blocked exchange field are checked against the terminating exchange of the call. If there is a match, the call is blocked.

BRIEF DESCRIPTION OF THE FIGURES

The foregoing and other objects, aspects and advantages will be better understood from the following detailed description of a preferred embodiment as illustrated in the following drawings. In the drawings, like reference numbers indicate identical or functionally similar elements.

DETAILED DESCRIPTION OF THE PREFERRED EMBODIMENTS

In the following description, the term "network" is a short-hand description of the conglomeration of databases, trunk and telephone lines, routers, switches, protocols, and computers that are required to make a telecommunications network.

In short, the preferred embodiment of the present system and method allows particular terminating exchanges to be blocked from particular originating countries. Particular countries have country codes (CCs) associated with them, and a record is maintained for each CC. Although the preferred embodiment uses CCs, codes indicating smaller units, such as provinces, or cities, could be used. These CC records are maintained in a Screening for International Calls database (SCREENING INTERNAT'L) 564, which is shown added to the ISN platform 150 in FIG. 5. SCREENING INTERNAT'L 564 can be located outside the ISN platform 150 in other embodiments, but both Fraud Control 100 and the ISN platform 150 must have some sort of access to it.

The CC records in the Screening for International Calls database are keyed by the country code and contain information concerning categories of billing products (calling cards, collect calls, third party calls, etc.), type of call, and exchanges that are blocked. Specifically, a blocked exchange field is added to the records in the SCREENING INTERNAT'L 564 database; and any exchange listed in that field is blocked from receiving calls from the originating country. In other words, when the record of a particular country or country code is looked up in the SCREENING INTERNAT'L 564, it is also determined if the terminating exchange of the call is listed in the blocked exchange field. If it is, the call is blocked. This system can also achieve greater granularity by breaking down the billing products within the CC record. In other words, if CC=14 was the United Kingdom, the CC record may list a different set of blocked exchanges for a calling card vs. a collect call. In addition, although the terms "exchange" and "blocked exchange field" is used for the rest of this description, it should be understood that, in addition to an exchange (NPA-NXX), both wider areas (e.g., NPA-N) and smaller areas (e.g., NPA-NXX-XXX) than exchanges can be placed in the blocked exchange field.

By use of the SCREENING INTERNAT'L 564, an entire country can be blocked, but that country is only blocked from making calls to specific exchanges, rather than the entire system. This is ideal for the case of the international hacker who is using multiple calling cards to call a particular area or exchange. Once that terminating exchange is entered in the appropriate CC record, the hacker will be blocked, regardless of what calling card he or she uses.

Figure 5:
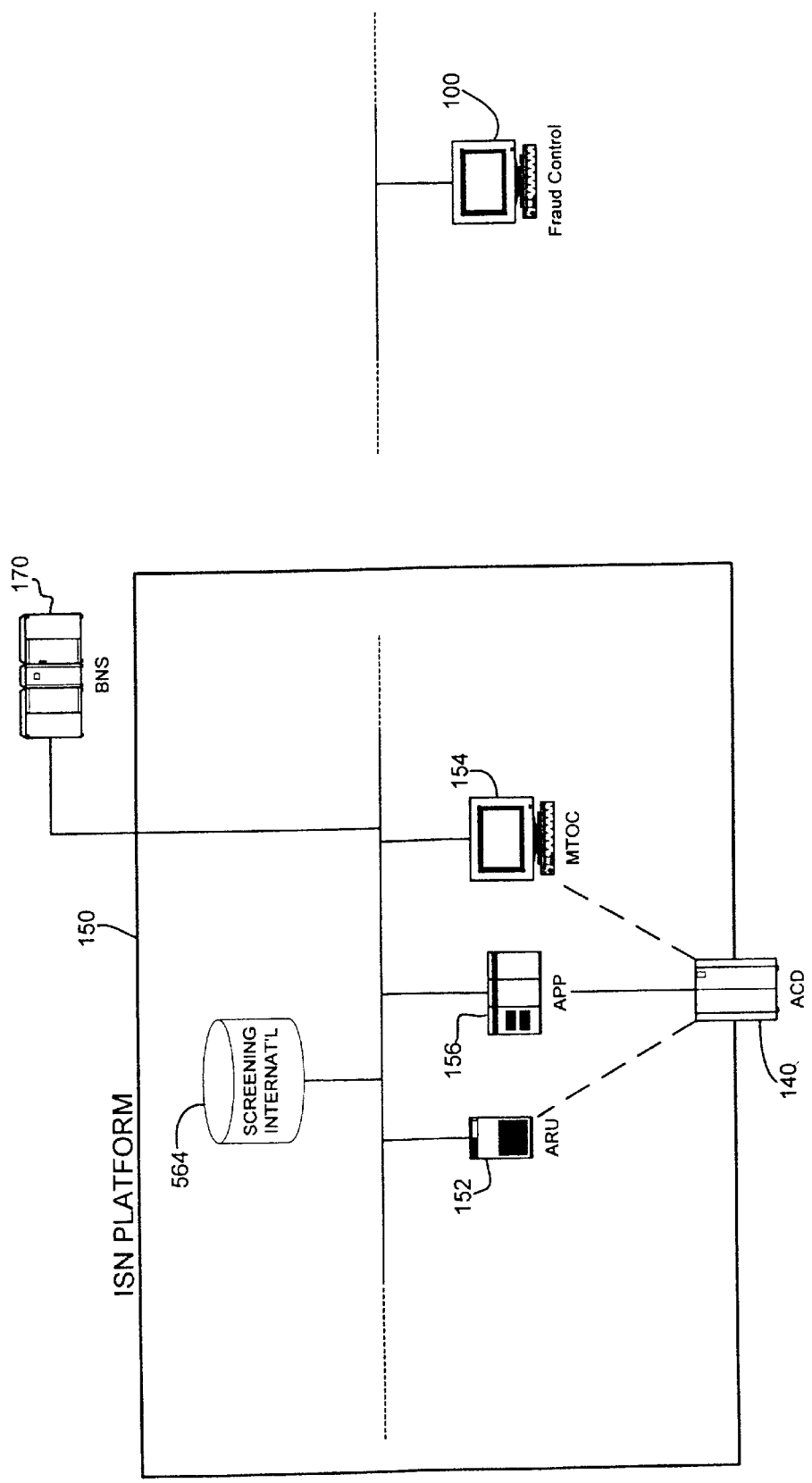
FIG. 5 is a schematic diagram of an exemplary and simplified call processing platform with associated fraud control system, according to the preferred embodiment of the present invention.

In the preferred embodiment, Fraud Control console 100 in FIG. 5 monitors network traffic in order to determine what exchanges should be blocked from which countries., Typically, Fraud Control console 100 maintains a fraud-to-revenue ratio in relation to particular countries calling particular exchanges. Once this fraud-to-revenue ratio reaches a certain threshold, Fraud Control 100, either manned by a fraud analyst or under the control of an automated program, will decide whether to place a block on that terminating exchange. If it is decided to do so, the terminating exchange will be placed in the blocked exchange field of the INTERNAT'L SCREENING 166 record of the originating country. In addition, the Fraud Control console 100 has the ability to block larger and smaller areas by altering the digits of the exchange to "wildcard" characters. For example, if not only the exchange 555-444, but the entire series of 555-4XX (where X can be any digit from 0 to 9), has exceeded the fraud-to-revenue ratio from a certain originating country, the term "555-4**" can be placed in blocked exchange field of the CC record of that country, resulting in all calls to any exchanges beginning with "555-4" being blocked. On the other hand, if only one particular payphone, at ANI 555-444-1234, has exceeded the fraud-to-revenue threshold, that ANI, "555-444-1234", can be placed in the blocked exchange field of the CC record of the originating country.

Figure 1A:
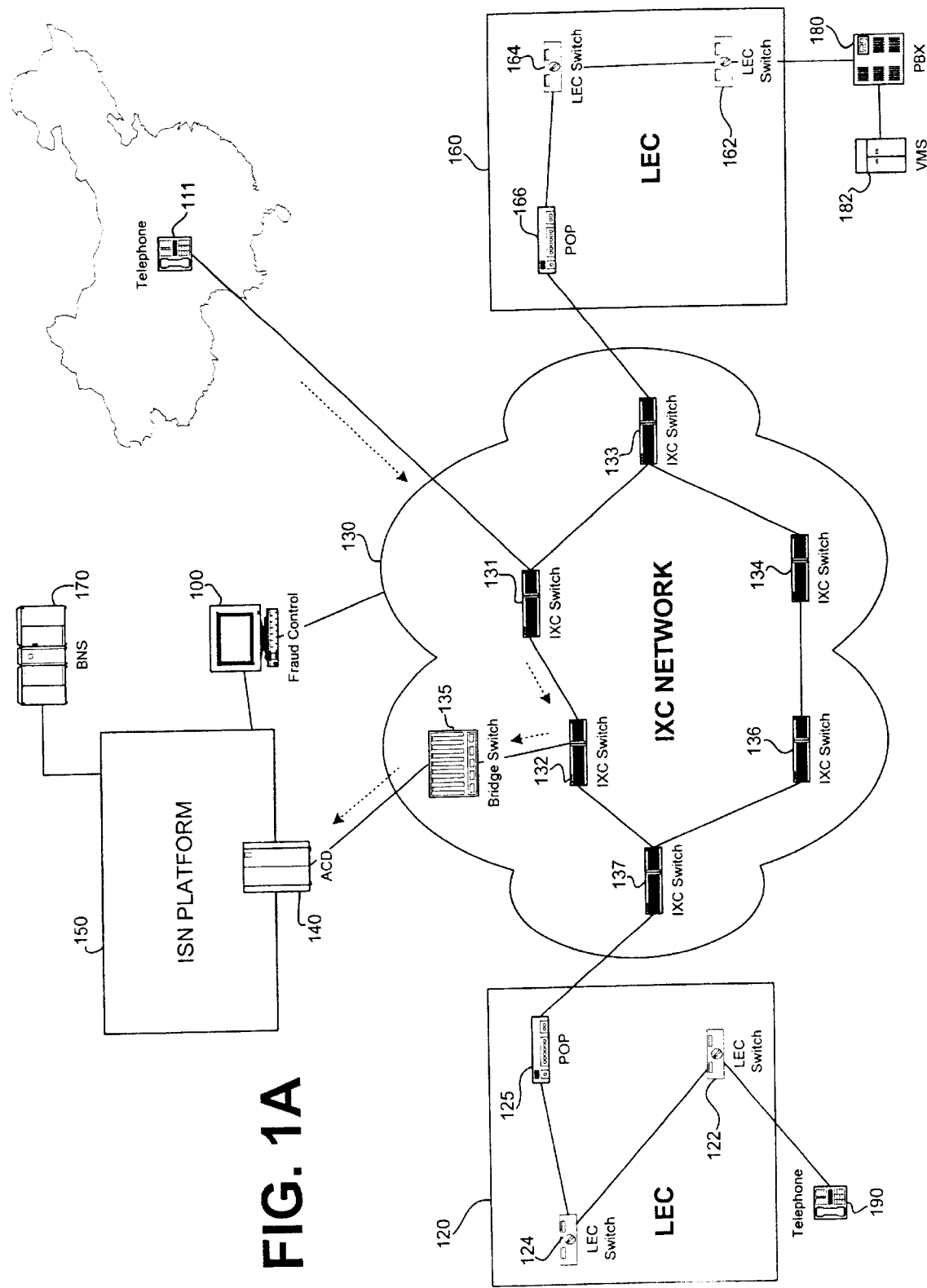
FIGS. 1A, 1B, and 1C are schematic diagrams of a fraudulent international special service call in a long distance telecommunications system, according to the prior art.
Figure 1B:
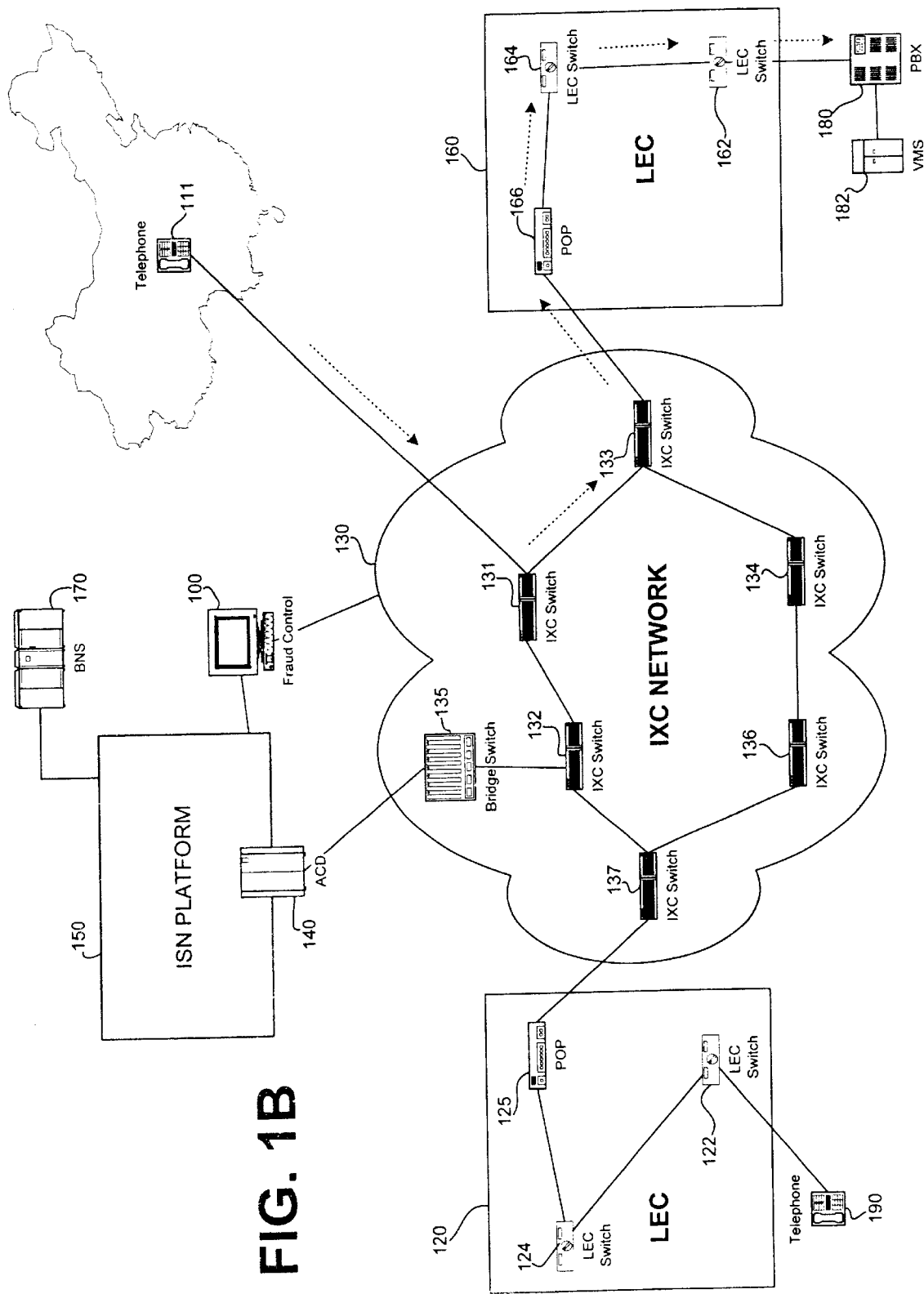
Figure 1C:
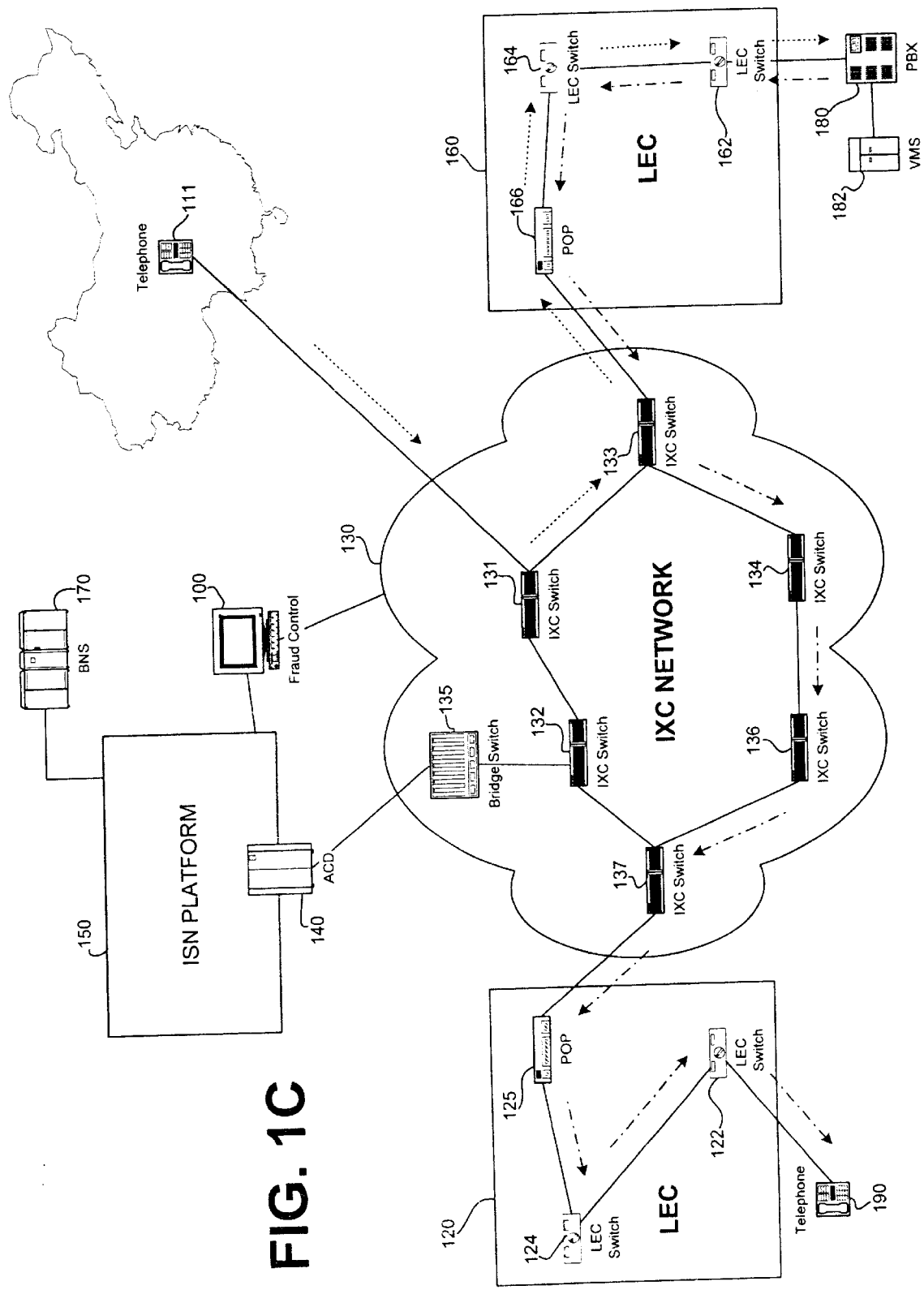
Figure 2:
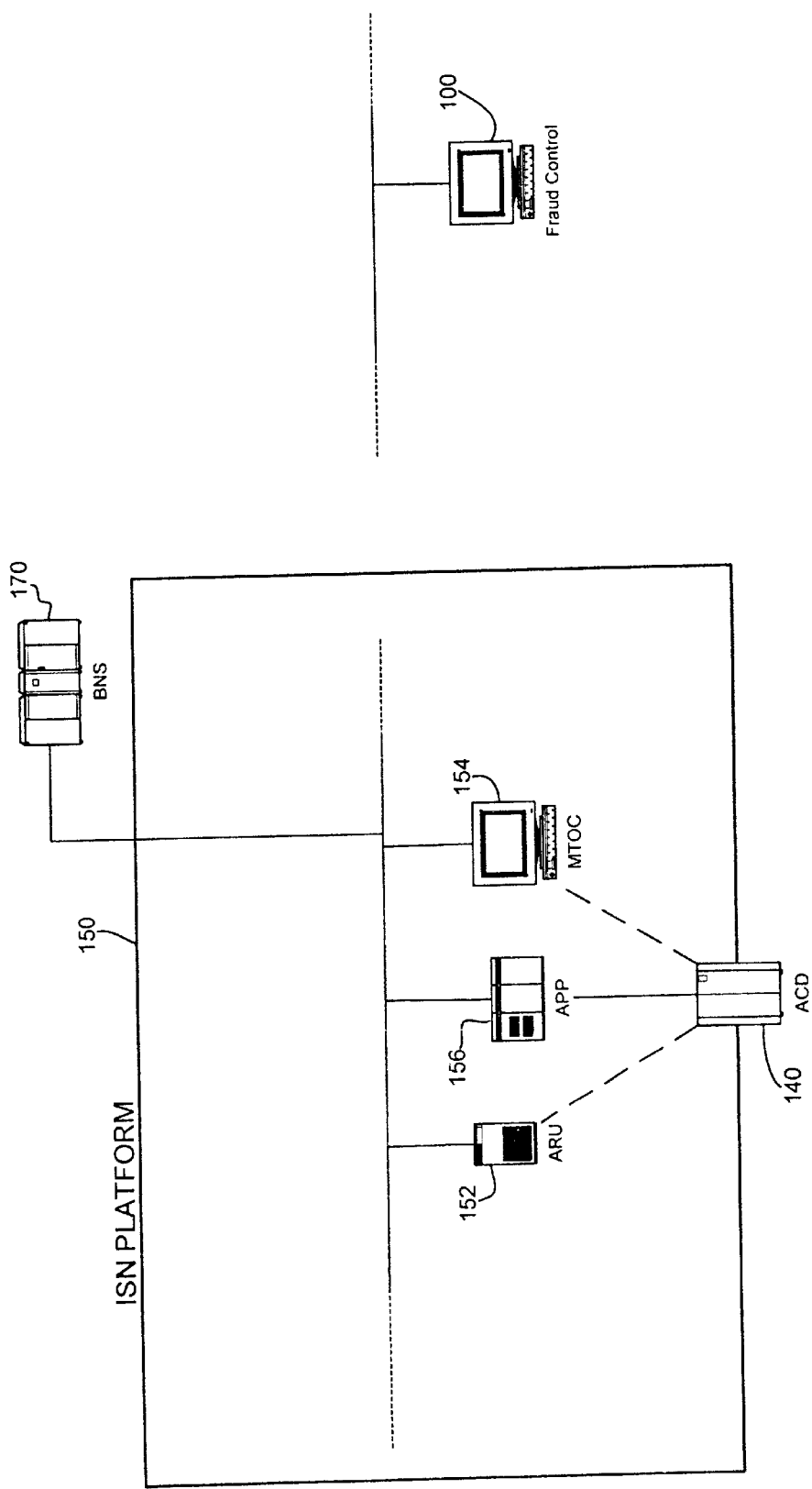
FIG. 2 is a schematic diagram of an exemplary and simplified call processing platform with associated fraud control system, according to the prior art.
Figure 3:
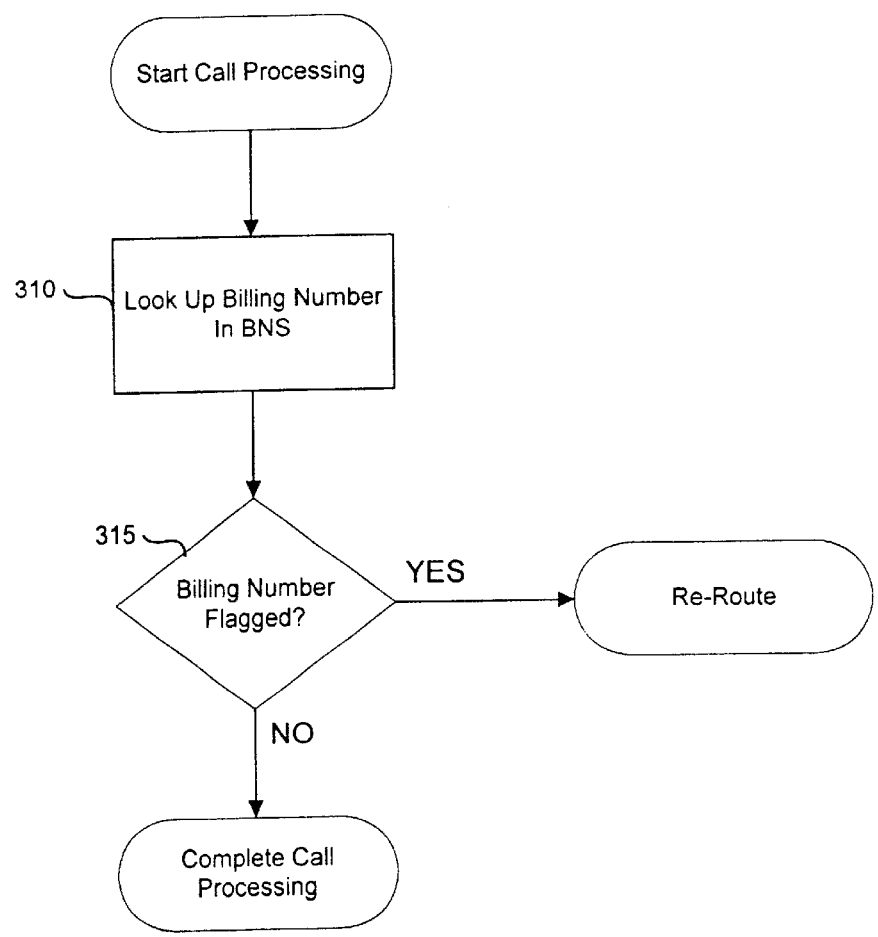
FIG. 3 is a flowchart of an international special service call processing procedure, according to the prior art.
Figure 4:
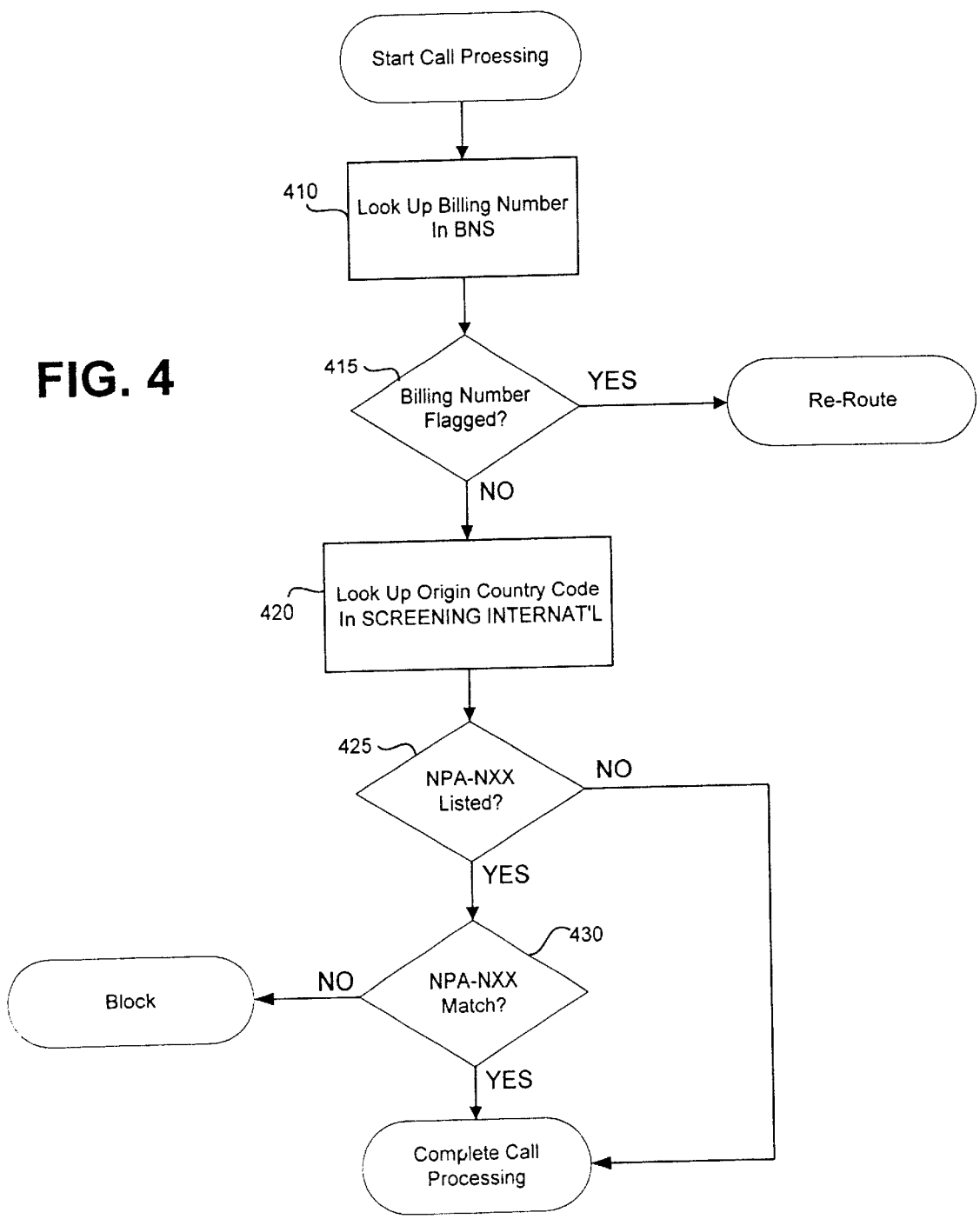
FIG. 4 is a flowchart of an international special service call processing procedure, according to the preferred embodiment of the present system and method.

An exemplary and simplified international special service call processing procedure according to the preferred embodiment of the present invention will be described with reference to FIG. 4. The special service calls considered here all have an international origination. As stated above, many steps that are required for call processing have been eliminated from the description as unnecessary for the understanding of the preferred embodiment of the present invention.

In a similar manner to what was described above, the billing number associated with the customer account is looked up in the BNS 170 at step 410. In step 415, it is determined whether the billing product is flagged for fraud. If the billing number is flagged, the call will be re-routed or simply disconnected.

If the billing number is not flagged in step 415, the country code of the originating country is looked up in the SCREENING INTERNAT'L 564 database in step 420. Once the appropriate CC record is retrieved, it is determined, in step 425, whether any exchanges are listed in the blocked exchange field of that record. If there are no exchanges listed in step 425, call processing continues to completion. If there are exchanges listed in step 425, the listed exchange or exchanges are compared with the terminating exchange of the call in step 430. If they match, the call is blocked. If they do not match in step 430, call processing continues to completion.

While the present invention has been described with respect to a certain preferred embodiment, it should be understood that the invention is not limited to this particular embodiment, but, on the contrary, the invention is intended to cover all modifications, equivalents, and alternatives falling within the spirit and scope of the invention as defined by the appended claims.

What is claimed is:

1. A method for preventing fraud in a call from an international origin point to a domestic terminating point through a long distance telecommunications system comprising the steps of:
   a) maintaining at least one record in an international database, each record associated with an international origin point, each record having a label field for placing labels;
   b) accessing an international database record during call processing of said call, the international origin point of said call being associated with said international database record;
   c) determining if a label associated with said call matches one or more labels in the label field of said international database record; and
   d) blocking the call if it is determined there is a match in step (c).

2. The method as recited in claim 1, wherein each domestic terminating point has a location number, and each label corresponds to a portion of a location number.

3. The method as recited in claim 2, wherein the location numbers correspond to numbers of the format NPA-NXX-XXXX assigned in the North American Numbering Plan (NANP) and each label corresponds to at least one left-most digit of such an NANP number.

4. The method as recited in claim 3, wherein the label associated with said call is at least one left-most digit of an NANP number of the domestic terminating point of the call.

5. The method as recited in claim 1, wherein the call is a special service call, and steps (b), (c), and (d) are performed in a call processing platform.

6. The method as recited in claim 1, further comprising the step of:
   placing one or more labels in the label field of at least one record by a fraud control system when calls from the international origin point associated with said at least one record to a destination point associated with said one or more labels exhibit a high fraud-to-revenue ratio.

7. A device for preventing fraud in a call from an international origin point to a domestic terminating point through a long distance telecommunications system, comprising:
   an international database for maintaining at least one record, each record associated with an international origin point, and each record having a label field;
   means for determining if a label associated with said call matches one or more labels in the label field of an international database record, when said international database record is accessed during call processing of said call, the international origin point of said call being associated with said international database record; and
   means for blocking the call if it is determined that the label associated with said call matches the one or more labels in the label field of the international database record.

8. The device as recited in claim 7, wherein each domestic terminating point has a location number, and each label corresponds to a portion of a location number.

9. The device as recited in claim 8, wherein the location numbers correspond to numbers of the format NPA-X-XXXX assigned in the North American Numbering Plan (NANP) and each label corresponds to at least one left-most digit of such an NANP number.

10. The device as recited in claim 9, wherein the label associated with said call is at least one left-most digit of an NANP number of the domestic terminating point of the call.

11. The device as recited in claim 7, further comprising:
    a call processing platform, said platform including said determining means and said blocking means.

12. The device as recited in claim 7, further comprising:
    a fraud control system for placing one or more labels in the label field of at least one record when calls from the international origin point associated with said at least one record to a destination point associated with said one or more labels exhibit a high fraud-to-revenue ratio.

13. A method for preventing fraud in a special service call from an international origin point to a domestic terminating point through a long distance telecommunications system, said call having a country code corresponding to the international origin point, and a location number in North American Numbering Plan (NANP) format NPA-NXX-XXXX corresponding to the domestic terminating point, comprising the steps of:

a) retrieving a record keyed to the country code from an international database;

b) determining if at least one blocked number is listed in a blocked exchange field of the retrieved country code record;

c) determining if the at least one blocked number listed in the blocked exchange field of the retrieved country code record matches the beginning digits of the NANP location number corresponding to the domestic terminating point of said call, if it is determined that a number is listed in step (b); and d) blocking said call if a match is found in step (c).

14. The method as recited in claim 13, wherein said call has a billing number associated with a customer account of said long distance telecommunications system, the method further comprising the steps of:

retrieving a record keyed to the billing number in a billing number database;

determining if the retrieved billing number record indicates that the billing number is blocked from making special service calls; and blocking said call if it is determined that the billing number is not permitted to make special service calls.

15. The method as recited in claim 13, further comprising the step of:

placing one or more blocked numbers in the blocked exchange field of a country code record when calls from an international origin point corresponding to said country code record exhibit a suspicious pattern of activity, or calls from said international origin point to one or more domestic destination regions corresponding to said one or more blocked numbers exhibit a high fraud-to-revenue ratio.

16. A device for preventing fraud in a special service call from an international origin point to a domestic terminating point through a long distance telecommunications system, said call having a country code corresponding to the international origin point, and a location number in North American Numbering Plan (NANP) format NPA-NXX-XXXX corresponding to the domestic terminating point, comprising:

an international database for maintaining records, each record keyed to a country code, each record having a blocked exchange field;

a means for retrieving an international database record of a country code during call processing of said call, said country code being the country code corresponding to the international origin point;

a first means for determining if at least one blocked number is listed in the blocked exchange field of the retrieved international database record;

a second means for determining if the at least one blocked number listed in the blocked exchange field of the retrieved international database record matches the beginning digits of the NANP location number corresponding to the domestic terminating point of said call, if the first determining means determines that at least one blocked number is listed in the blocked exchange field of the retrieved international database record, and a means for blocking said call if the second determining means determines there is a match.

17. The device as recited in claim 16, further comprising:

a call processing platform having the retrieving means, both the first and second determining means, and the blocking means; and a means for communicating between the call processing platform and the international database.

18. The device as recited in claim 16, further comprising:

a fraud control system for placing one or more blocked numbers in the blocked exchange field of an international database record when calls from the international origin point corresponding to said international database record exhibit a suspicious pattern of activity or calls from said international origin point corresponding to said international database record to regions corresponding to the one or more blocked numbers exhibit a high fraud-to-revenue ratio.

* * * * *